United States Patent [19]
Gorman

[11] Patent Number: 5,533,809
[45] Date of Patent: Jul. 9, 1996

[54] REMOTE CONTROL CADDY

[76] Inventor: Mary J. Gorman, 116 Garfield Ave., Cherry Hill, N.J. 08002

[21] Appl. No.: 404,951
[22] Filed: Mar. 16, 1995
[51] Int. Cl.⁶ ..................................................... B65D 33/14
[52] U.S. Cl. .................. 383/11; 383/13; 383/22; 383/109; 206/320; 224/901
[58] Field of Search .................... 383/6, 11, 13, 383/22, 23, 24, 68, 89, 25, 33, 109; 224/194, 252, 269, 901; 206/320; 150/102, 134, 161, 165

[56] References Cited

U.S. PATENT DOCUMENTS

| | | | |
|---|---|---|---|
| 1,997,941 | 4/1935 | McGiff et al. | 383/34 |
| 3,374,508 | 3/1968 | Slimovitz | 383/11 X |
| 4,548,375 | 10/1985 | Moss | 383/24 X |
| 4,733,776 | 3/1988 | Ward. | |
| 4,815,683 | 3/1989 | Ferrante. | |
| 4,951,817 | 8/1990 | Barletta et al.. | |
| 4,991,817 | 2/1991 | VonKleist et al.. | |
| 5,111,981 | 5/1992 | Allen | 224/252 X |
| 5,190,197 | 3/1993 | Novak | 224/901 X |
| 5,195,634 | 3/1993 | Zaug. | |
| 5,266,772 | 11/1993 | Reed | 150/161 X |
| 5,316,141 | 5/1994 | Jalomo. | |

FOREIGN PATENT DOCUMENTS 52801   2/1990   Japan ........................ 383/33

Primary Examiner—Jes F. Pascua
Attorney, Agent, or Firm—Norman E. Lehrer; Jeffrey S. Ginsberg

[57] ABSTRACT

A remote control caddy for supporting a remote control unit therein includes a front wall, a rear wall, a pair of opposing side walls, a bottom wall and an open top end. The walls define a cavity for receiving the remote control unit through the open top end. Secured to the interior of each of the walls is a liner that protects the remote control units against mechanical shock. The remote control caddy can be releasably secured to the piping on a piece of furniture by way of a pair of clips that are secured to and extend above the top of the rear wall.

6 Claims, 1 Drawing Sheet

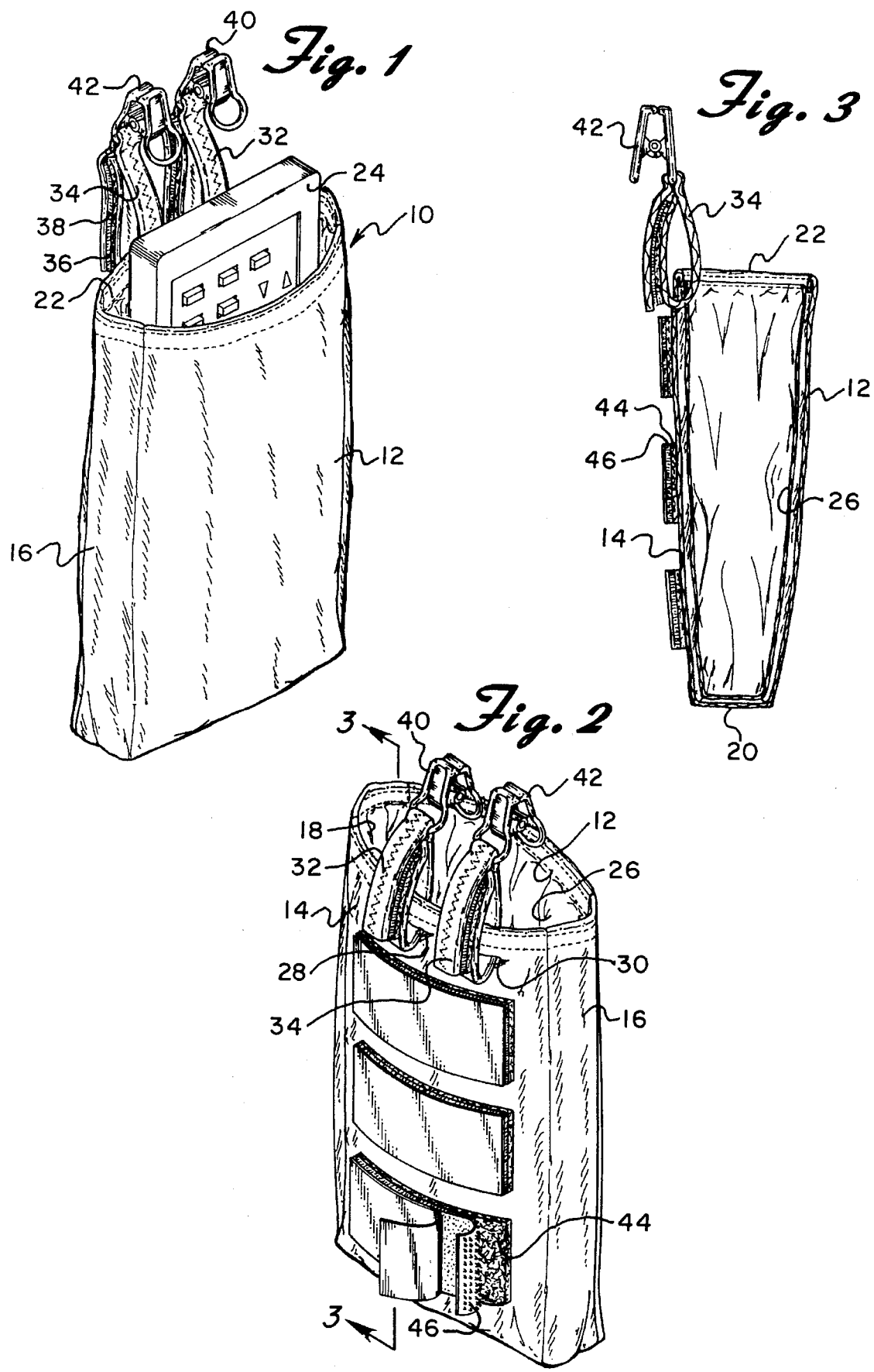

5,533,809

REMOTE CONTROL CADDY

BACKGROUND OF THE INVENTION

The present invention is directed toward a remote control caddy for supporting a remote control unit therein and, more particularly, to such a caddy that can be secured to a piece of furniture so that the location of the remote control can readily be ascertained.

Televisions, video cassette recorders, compact disc players and the like are commonly accompanied by remote control units. The remote control units allow a user to operate the aforementioned devices while being far from the same. A common problem associated with the use of these units is the misplacement of the same. This is primarily due to the small size of the remote controls.

In recognition of this problem, holders for remote control units have been developed. For example, U.S. Pat. No. 4,815,683 discloses a rigid holder for remote control units that has four walls and a bottom. The holder is designed to be secured to a television set via adhesive strips or Velcro hook and loop type fastening tape. A problem with these securing methods, however, is that the television or other mounting surface can be permanently damaged by the adhesive on the adhesive strips or on back of the hook and/or loop tape.

The above mentioned patent also states that the holder can be attached to a metallic surface by means of magnets secured thereto. Such a fastening means, however, would not be suited to securing the holder to a piece of furniture or other non-metallic surface.

U.S. Pat. No. 5,195,634 also discloses a remote control holder that includes a rigid enclosure that has a compartment for holding a remote control unit therein. An attaching mechanism connects the remote control unit to the holder so that the unit cannot be separated from its holder. Since the enclosure is larger than the remote control unit, the possibility of misplacement is reduced. However, the holder can still be misplaced as it is freely moveable and is not secured to a larger mounting surface.

U.S. Pat. No. 5,316,141 discloses a cover for a remote control that includes four walls, a bottom wall and a top flap. The cover is preferably made of polyvinyl chloride and has a rubber foam liner. This cover does not include means to secure the same to a stationary object so that its location can easily be ascertained.

SUMMARY OF THE INVENTION

The present invention is designed to overcome the deficiencies of the prior art discussed above. It is an object of this invention to provide a remote control caddy that is comprised of flexible walls to provide an aesthetically pleasing appearance.

It is a further object of the invention to provide such a caddy that can be readily secured to a piece of furniture without damaging the same.

It is still another object of the invention to provide a caddy that protects a remote control unit inserted therein from mechanical shock.

In accordance with the illustrative embodiments, demonstrating features and advantages of the present invention, there is provided a remote control caddy comprising four walls, a bottom wall and an open top end. At least one mounting spring clip extends from the top of one of the walls. The clip is adapted to secure the caddy to the piping of a piece of furniture or other suitable surface so that the caddy's location is readily ascertainable.

Other objects, features and advantages will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of the remote control caddy according to the present invention with a remote control unit inserted therein;

FIG. 2 is a rear side perspective view of the remote control caddy, and

FIG. 3 is a cross-sectional view taken along lines 3—3 of FIG. 2.

DETAILED DESCRIPTION OF THE PREFERRED EMBODIMENT

Referring now to the drawings in detail wherein like reference numerals have been used throughout the various figures to designate like elements, there is shown in the figures a remote control caddy for holding a remote control unit constructed in accordance with the principles of the present invention and designated generally as 10. While the invention is described with regards to holding a remote control unit therein, its use is not limited thereto. For example, the same caddy can be used to accommodate other devices, such as a portable telephone, a pair of eyeglasses, a beeper or the like.

The remote control caddy 10 preferably includes a front wall 12, a rear wall 14, side walls 16 and 18, a bottom wall 20 and an open top end 22. The walls define a cavity that is larger than the remote control unit 24 that is to be supported therein. Accordingly, one or more remote control units can readily be inserted in and removed from the caddy 10. The walls are preferably comprised of a flexible vinyl material. However, they can be made of a variety of other materials. While the material is somewhat flexible, it is rigid enough to hold the shape shown in the figures.

In the preferred embodiment, a liner 26 comprised of a flexible sheetlike silky fabric material is affixed to the interior of each of the walls 12, 14, 16 and 18. The liner 26, which may also include padding, protects the remote control unit 24 from mechanical shock caused by the caddy 10 striking a hard surface. Moreover, the silky feature of the liner facilitates the entry of the remote control into the caddy as well as the removal from the same.

Formed in the top of rear wall 14 are a apertures 28 and 30. Straps 32 and 34 are adapted to be secured through a corresponding one of the apertures. Each of the straps preferably has a plurality of VELCRO loop type fasteners 36 secured to an upper portion thereof and a plurality of Velcro hook type fasteners 38 secured to a bottom portion thereof. The hook and loop type fasteners are adapted to mate with one another so that the straps 32 and 34 can have their ends secured to one another. When the ends are so mated, the straps take the form of loops. Spring clips 40 and 42 are secured to the upper portion of a corresponding one of the loops to allow the caddy 10 to be secured to the piping on a piece of furniture or to a similar projection. The clips can also be used to secure the caddy directly to the fabric that covers a piece of furniture.

The remote control caddy 10 can be mounted to objects in other ways. More specifically, the outside of the rear wall 14 has a plurality of Velcro hook and loop type fasteners 44 and 46, respectively, secured thereto. The loop type fasteners are adapted to be secured to the object the holder is to be mounted to. This is accomplished by securing the loop type fasteners 44 to the object by an adhesive. The caddy could also be mounted in a number of other ways. For example, magnetic strips can be secured to the rear wall 14 in lieu of the hook and loop type fasteners. This would allow the caddy to be secured to an object made of a ferromagnetic material.

The present invention may be embodied in other specific forms without departing from the spirit or essential attributes thereof and accordingly reference should be made to the appended claims rather than to the foregoing specification as indicating the scope of the invention.

What is claimed is:

1. A remote control caddy for supporting a remote control unit therein comprising:

an enclosure means including a front wall, a rear wall, a pair of opposing side walls, a bottom wall and an open top end, said walls defining a cavity for receiving said remote control unit through said open top end;

liner means being secured to the interior of each of said walls for protecting said remote control unit against mechanical shock, and means for releasably securing said remote control caddy to a piece of furniture, said securing means including a pair of spring clips secured to and extending above the top of said rear wall.

2. The remote control caddy of claim 1 wherein said walls are comprised of a flexible material.

3. The remote control caddy of claim 1 wherein said walls are comprised of vinyl.

4. The remote control caddy of claim 1 further including a pair of loops extending upwardly from the rear wall of said caddy, said clips being connected to said loops.

5. The remote control caddy of claim 1 further including a plurality of hook and loop type fasteners secured to said rear wall, said loop type fasteners adapted to be secured to a piece of furniture.

6. The remote control caddy of claim 1 further including a plurality of hook and loop type fasteners secured to said rear wall, said hook type fasteners adapted to be secured to a piece of furniture.

* * * * *